United States Patent [19]

Demers et al.

[11] 4,422,029

[45] Dec. 20, 1983

[54] INSTANT REVERSE CONTROL CIRCUIT FOR A SINGLE PHASE MOTOR

[75] Inventors: J. T. Maurice Demers; Peter G. Stefanatos, both of Quebec, Canada

[73] Assignee: Doorlec Corporation/Corporation Doorlec, Montreal, Canada

[21] Appl. No.: 379,921

[22] Filed: May 19, 1982

[30] Foreign Application Priority Data

May 28, 1981 [CA] Canada ..................... 378548

[51] Int. Cl.³ ............................................. H02P 1/44
[52] U.S. Cl. .................................... 318/753; 318/793
[58] Field of Search ................. 318/739–741, 318/763, 753, 781, 785, 793, 468, 266

[56] References Cited

U.S. PATENT DOCUMENTS

| | | | |
|---|---|---|---|
| 830,158 | 9/1906 | Magnuson | 318/267 |
| 949,465 | 6/1907 | Dickinson | 187/290 |
| 1,056,879 | 12/1918 | Baehr | 318/262 |
| 2,459,906 | 1/1949 | Weber | 318/265 |
| 2,528,181 | 10/1950 | Sacchini | 318/275 |
| 2,572,785 | 10/1951 | Vaughn | 318/266 |
| 2,671,190 | 3/1954 | Bale | 318/265 |
| 2,674,710 | 4/1954 | Pitman | 318/753 |
| 2,707,259 | 4/1955 | Rech | 318/753 |
| 2,780,762 | 2/1957 | Gayer | 318/753 |
| 2,804,582 | 8/1957 | Guth | 318/753 |
| 2,863,109 | 12/1958 | Meyer | 318/753 |
| 3,009,088 | 11/1961 | Prouty | 318/753 |
| 3,183,424 | 5/1965 | Goldberg | 318/753 |
| 3,229,181 | 1/1966 | Evans | 318/293 |
| 3,296,513 | 1/1967 | Morton | 318/265 |
| 3,532,952 | 10/1970 | Cagnon et al. | 318/466 |

*Primary Examiner*—J. V. Truhe
*Assistant Examiner*—Patrick C. Keane
*Attorney, Agent, or Firm*—Larson and Taylor

[57] ABSTRACT

Disclosed is an instant reverse control circuit for a single phase, squirrel cage induction motor that has an exemplary use for opening and closing elevator doors. The motor has a running winding and a motor starting circuit comprised of serially connected start winding, capacitor, and centrifugal switch for deenergizing the start winding when the motor is up to running speed. The control circuit includes a relay operated, power reversing switch that supplies power to the starting circuit through an additional relay operated instant reverse switch. The instant reverse relay that operates the switch is connected in parallel with the starting circuit and its switch has a relay maintaining contact and a bypass contact. The bypass contact supplies reverse power to the start winding when the motor is to be reversed suddenly, such as to open a closing door that has struck an obstruction.

7 Claims, 5 Drawing Figures

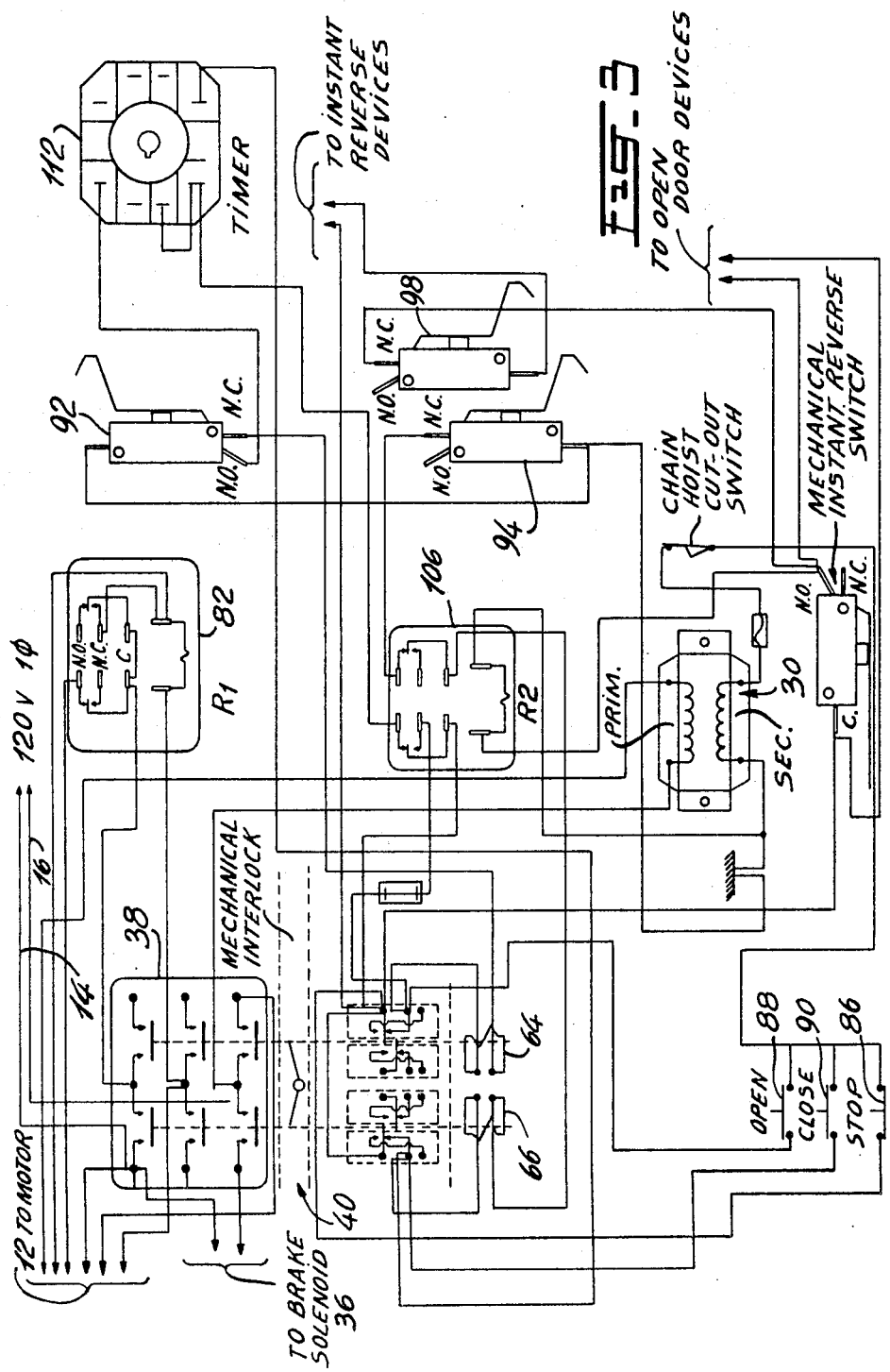

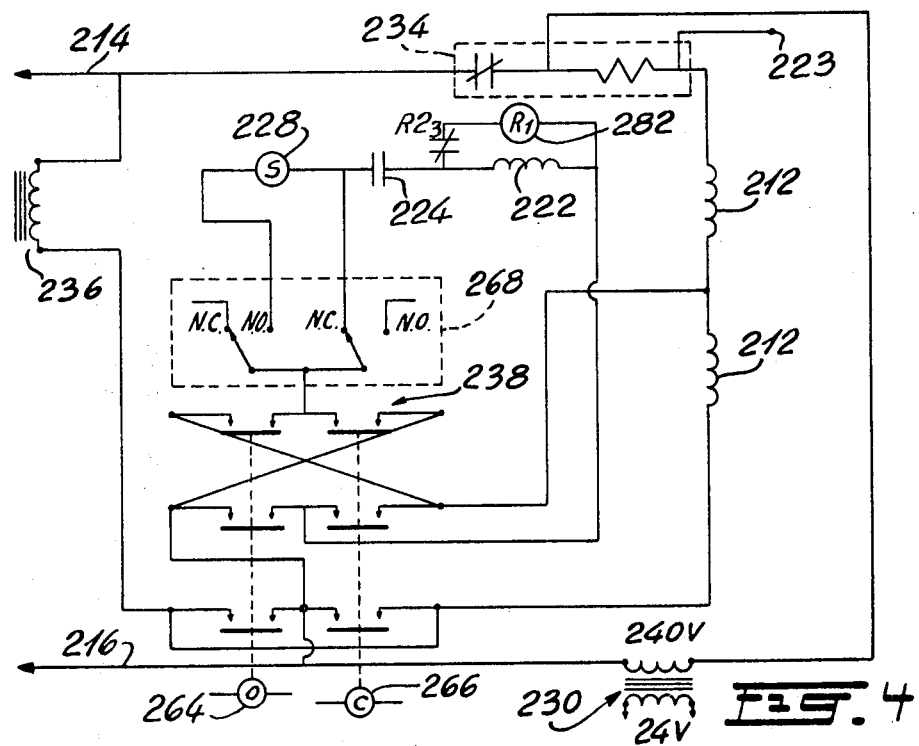
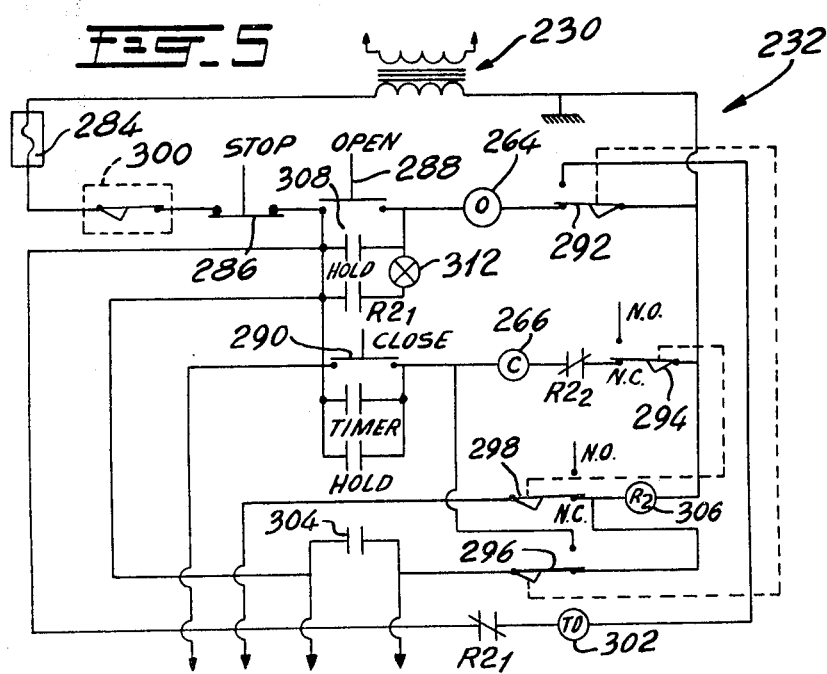

INSTANT REVERSE CONTROL CIRCUIT FOR A SINGLE PHASE MOTOR

FIELD OF THE INVENTION

The present invention relates to control circuits for a single phase motor and in particular relates to an instant reverse control circuit for capacitive start single phase electric motors such as the type that operates doors.

BACKGROUND OF THE INVENTION

In the automatic operating door industry, as well as in other industrial fields, electric motors are used to operate doors and other components. The electric motors can usually be started in either direction of rotation (i.e., clockwise or counterclockwise), and they are allowed to run for a certain period of time after which they are completely stopped. For example, a motor will be energized to turn in the clockwise direction to open a door until a limit switch in the control circuit is operated by the opening door, whereupon the motor is deenergized and stopped. Subsequently, the motor will be energized to turn in the counterclockwise direction to close the door until a further limit switch in the control circuit is operated by the closing door, whereupon the motor is deenergized and stopped. Any standard general purpose motor can be used with no difficulty.

In some applications, such as motor driven doors, there is a need for instantly stopping the motor and reversing its direction. For example, motor driven doors when they are closing can damage persons or equipment if they are not provided with some sort of sensing equipment (e.g., pneumatic or mechanical safety edges, sound beams, or photoelectric beams) which will detect an obstruction in the pathway of the door and be used to cause the motor to stop instantly and immediately start in the opposite direction so as to open the door. Such safety equipment is intended to minimize the risk of damage to the door equipment and to the obstruction in the pathway of the door. In particular, such safety equipment is required if the door is likely to strike a person or a pet animal.

Instant reversal is readily available in the case of three phase motors simply because of the manner in which such motors are started and operated. The instant reversal safety feature can be used with standard three phase motors without any special connections or expensive control circuits. However, in the case of single phase motors, an instant reversal of the motor is not possible unless a special purpose motor and a special purpose control circuit with expensive direction sensing switches and current operated reversing relays is used. Although such special purpose motors are conventional and are available on the open market, they are considerably more expensive and in lower supply than a general purpose motor of the same Horsepower rating. Such general purpose motors are usually of the squirrel cage design and use a capacitive start winding temporarily connected in the circuit to provide a phase shift needed to start the motor. This type of capacitor start single phase squirrel cage electric motor is conventional and has been commercially available for a long time.

Thus, there is need for an inexpensive control circuit for use with a conventional single phase, squirrel cage electric motor that is easily and inexpensively adaptable to such motors.

SUMMARY OF THE INVENTION

Accordingly, it is an object of the present invention to provide a control circuit for a single phase general purpose motor, such as of the capacitor start type, that provides an instantly reversible electric motor. It is another object of the present invention to provide an inexpensive, exteriorly mounted control circuit modification to provide the instant reversibility of a single phase general purpose motor.

The present invention is usable with either a 120 volt single phase squirrel cage electric motor or a 240 volt single phase squirrel cage electric motor. The present invention is not only adaptable to commercial motors of the foregoing type, but it can be built into the control circuit of newly manufactured electric motors. The present invention is extremely inexpensive, easily installable, reliable, and uncomplicated in construction. Thus, a control circuit according to the present invention is dependable, reliable, and relatively maintenance free.

According to one embodiment of the present invention, a control circuit is provided for a single phase, alternating current electric motor that has a running winding, a starting circuit that comprises a start winding and a capacitor connected in series, and a switch means for deenergizing the starting circuit when the motor has attained its operating speed. The control circuit comprises a switch means for reversing the current direction through the start winding of the motor and a switch means for bypassing the deenergizing switch means such that the starting circuit can be energized while the motor is still running in the opposite direction, thereby rapidly decelerating the motor.

Other features and advantages of the present invention will be set forth in or apparent from the following detailed description of presently preferred embodiments taken in conjunction with the appended drawings.

BRIEF DESCRIPTION OF THE DRAWINGS

FIG. 3 is an electrical wiring diagram of the circuits depicted in FIGS. 1 and 2.

FIG. 4 is a schematic electrical circuit diagram of an alternate embodiment of a power circuit for a motor according to the present invention that is operated on 240 volts.

FIG. 5 is a schematic electrical circuit diagram of the control circuit for the power circuit depicted in FIG. 4.

DETAILED DESCRIPTION OF THE PREFERRED EMBODIMENTS

Figure 1:
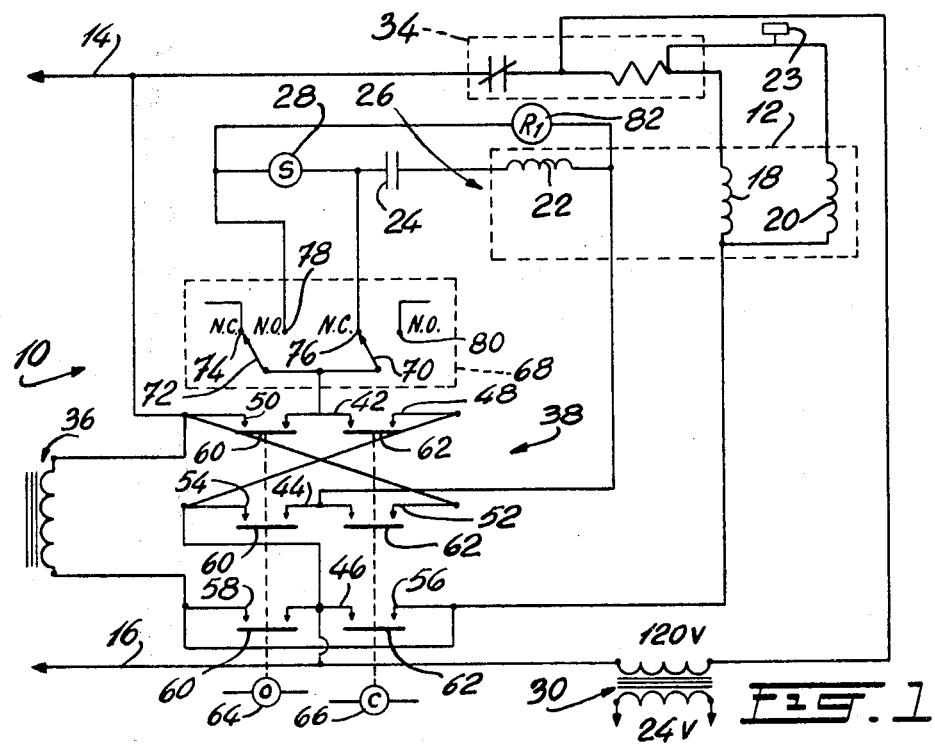
FIG. 1 is a schematic electrical circuit diagram of the motor power circuit according to the present invention.
Figure 2:
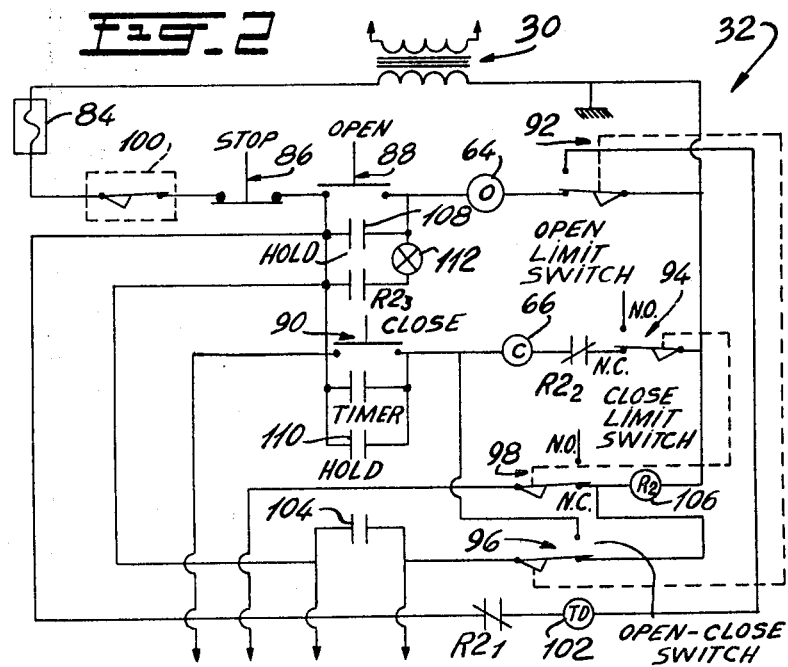
FIG. 2 is a schematic electrical circuit diagram of the control circuit for the power circuit as depicted in FIG. 1.

Referring now to FIGS. 1, 2 and 3, wherein like numerals designate like elements throughout the several views, and in particular with respect to FIG. 1, a control circuit 10 for a single phase alternating current motor, indicated schematically at 12, is depicted. Control circuit 10 is energized through supply contacts 14 and 16 that are connectable to a standard, conventional source of 120 volt, single phase alternating current power. Motor 12 is a conventional squirrel cage electric motor that comprises two 120 volt running windings 18 and 20 and a start winding 22 with a wire nut 23 therebetween. The starting phase shift is provided by a capacitor 24 connected in series with start winding 22, and capacitor 24 and start winding 22 together comprise a starting circuit 26 for electric motor 12. Starting circuit 26 is de-energized when electric motor 12 attains its running speed by a de-energizing switch means such as a conventional centrifugal switch 28.

Control circuit 10 also includes a 120 volt-24 volt step down transformer 30 for supplying power to a switch control circuit 32 depicted in FIG. 2. In addition, control circuit 10 has an overload protection circuit 34. In addition, control circuit 10 can include connections to a brake solenoid 36 if desired.

Conventional squirrel cage induction motors, such as motor 12, will normally run in either direction, depending upon the direction of rotation in which the starting current flows through start winding 22. Accordingly, a multi-pole, multi-throw reversing switch 38 is provided to reverse the current flow through start winding 22. In the depicted embodiment, switch 38 is a triple-pole, double-throw switch that is activated by two different relays through a mechanical interlock (shown schematically at 40 in FIG. 3). Switch 38 includes poles 42, 44, and 46 respectively connectable to contacts 48 and 50, 52 and 54, and 56 and 58. Contacts 48 and 54 are wired together and contacts 50 and 52 are wired together so as to provide a reversing switch for poles 42 and 44 of switch 38. Two sets of three ganged relay contacts 60 and 62 in switch 38 are operated respectively by an open relay coil 64 and a close relay coil 66.

Switch contacts 58 and 56 are connected together so that when either relay contacts 60 or 62 are made, one side of running windings 18 and 20 are powered through pole 46, which in turn, is connected to supply contact 16. The other side of running windings 18 and 20 are connected through overload protection circuit 34 to the other supply contact 14. Power for the reversing portion of switch 38 is provided through supply contact 14 to switch contact 50, for one side of the power supply, and from supply contact 16 through pole 46 to switch contact 54.

One of the outputs from the reversing portion of switch 38, through pole 44, is connected to the start winding side of starting circuit 26. The other end of starting circuit 26 is connected through a relay operated, double-pole, double-throw switch 68 to the other output of the reversing portion of switch 38 through pole 42.

Switch 68 is comprised of two poles 70 and 72 connected together and respectively connected to normally closed contacts 74 and 76 or to normally open contacts 78 and 80 depending upon whether a reversing relay 82 is deenergized or energized, respectively.

As is shown in FIG. 1, reversing relay 82 is connected in parallel to starting circuit 26. The start winding side of starting circuit 26, as mentioned above, is connected to pole 44 of the reversing portion of switch 38. The other side of starting circuit 26 is connected through normally open contact 78 to pole 42 of switch 38. The connection between pole 72 and switch contact 78 when made by the energizing of reversing relay 82 acts as a maintaining contact for reversing relay 82 to keep it energized. Normally closed contact 76 is connected to a point in starting circuit 26 between centrifugal switch 28 and capacitor 24. In this way, starting circuit 26 can be powered through switch 38 when centrifugal switch 28 is open (i.e. when motor 12 is running at its normal speed) and when reversing relay 82 is deenergized.

The operation of open relay 64 and close relay 66 is shown in switch control circuit 32 in FIG. 2. As mentioned above, switch control circuit 32 is powered through transformer 30 and is protected by a fuse 84. A control panel to permit operation of control circuit 10 contains a normally closed "stop" push button 86, a normally open "open" push button 88, and a normally open "close" push button 90. Switch control circuit 32 is depicted for the operator of a door which has a safety edge that is activated when the door strikes an obstruction. Therefore, much of the elements of switch control circuit 32 are particular to this embodiment, but are not needed for the operation of the present invention.

In particular, switch control circuit 32 has an open limit switch 92 and a close limit switch 94 that are normally closed and are operated by the door being in either the open or the closed position. Open limit switch 92 and close limit switch 94 are respectively ganged to an open-close switch 96 and an instant reverse cut-out switch 98, both of which are normally closed. Also provided is a manual hoist interlock switch 100 and a closing timer, timed delay relay 102. Also shown is a normally open switch 104 for an electromechanical instant reverse system (not shown) to automatically cause a closing door to be opened.

The relay which permits the switching between the closing of a door, accomplished by closing relay 66 being energized, to opening of the door, accomplished by energizing of opening relay 64, is a safety relay 106 designated R2. As can be seen from FIG. 2, safety relay 106 has two normally closed contacts $R2_1$ and $R2_2$ and one normally open contact $R2_3$. Finally, with respect to FIG. 2, open coil 64 and close coil 66 have maintaining contact 108 and 110, respectively.

It can therefore be seen with respect to FIGS. 1, 2 and 3, that a reversing relay 82 is connected in parallel with motor starting circuit 26 comprised of centrifugal switch 28, capacitor 24 and start winding 22 connected in series to one another. One set of reversing relay contacts 80 and 78 are maintaining contacts for reversing relay 82. A second set of reversing relay contacts 76 and 74 is connected as a bypass of centrifugal switch 28.

The operation of the circuits depicted in FIGS. 1, 2 and 3 is as follows. When motor 12 is to be started from a stopped or rest position, either half of switch 38 is energized by the depression of the open push button 88 or the close push button 90. The operation of one of these push buttons energizes the respective coil 64 or 66 and closes the respective maintaining contacts 108 or 110. The corresponding load contacts 56 and 46 or 58 and 46 are closed to provide power through running windings 18 and 20. As the same time, current is directed through start winding 22 in the appropriate direction depending upon whether open coil 64 or close coil 66 has been energized. Power flows through the start winding 22 because centrifugal starting switch 28 is closed at this time. As motor 12 accelerates to normal running speed in the selected direction, centrifugal switch 28 opens, thereby disconnecting starting circuit 26 from the power lines. The coil of reversing relay 82 is also energized at the starting time and stays energized as a result of a maintaining contact formed between contact 78 and pole 70 of switch 68. As long as either open coil 64 or close coil 66 is energized, reversing relay 82 will stay energized. Reversing relay disconnects pole 70 from contact 76 so as to prevent the reenergizing of start winding 22 after motor 12 has come up to speed.

When motor 12 is running in the direction for closing the door and an obstruction comes in contact with a safety sensing device, safety relay 106 is energized and its normally closed contacts R2₁ and R2₂ open. This immediately deenergizes close coil 66, which in turn opens its corresponding switch contacts in switch 38. This immediately disconnects power from the running windings, the starting circuit and reversing relay 82. As a result of safety relay 106 being energized, normally open relay contact R2₃ is closed and open coil 64 is energized. If desirable, a time delay can be inserted by time delay device 112 before open coil 64 is energized. As soon as open coil 64 is energized, contacts 58 and 46 are closed to energize running coils 12, and contacts 50 and 42 and contacts 54 and 44 are closed to apply power to one side of starting circuit 26 and to switch 68 in the reverse direction of current flow. Because reversing relay 82 is deenergized, bypass contact 76 connects with pole 70 thereby bypassing the open centrifugal switch 28 (which is open because motor 12 is still running at approximately its running speed) to energize starting circuit 26. As soon as starting circuit 26 is energized, start winding 22 applies a braking force to motor 12 and causes it to slow down. As soon as motor 12 slows down sufficiently, centrifugal switch 28 is closed and reversing relay 82 is energized again, thereby closing the maintaining contacts and opening the bypass contacts. Power will continue to flow through start winding 22 until motor 12 has come up to speed in the opposite direction so as to open the door. As soon as motor 12 is up to its running speed, centrifugal switch 28 again opens thereby effecting the deenergizing of starting circuit 26.

FIGS. 4 and 5 show the modification necessary for a 240 volt motor. Because most of the elements are similar, they are denoted by numerals having a value that is 200 greater than the value of the numerals used in FIGS. 1, 2 and 3. The principal differences between the two embodiments are that the running windings 218 and 220 are connected in series and an additional, normally closed, safety relay contact R2₃ is used to deenergize reversing relay 82 when safety relay 306 is energized by the opening of the appropriate switches caused by an obstruction in the path of the door.

Although the invention has been described in detail with respect to an exemplary embodiment thereof, it will be understood by those of ordinary skill in the art that variations and modifications may be effected within the scope and spirit of the invention. Thus, for example, one skilled in the art could devise an electrical circuit using solid state devices, such as TRIACS, instead of the depicted relays.

The embodiments of the invention in which an exclusive property or privilege is claimed are defined as follows:

1. In a control circuit for a single phase AC motor having a running winding, a starting circuit comprising a start winding and a phase shift device connected in series, and a switch means for deenergizing the starting circuit when the motor is running, the motor being capable of operating in either direction, the improvement comprising:
    reversing switch means for reversing the current direction through the start windings, said reversing switch means comprising a remotely operable double-pole, double-throw reversing switch having a set of first contacts, a set of second contacts, a set of common contacts, and two movable contact members for selectively, electrically connecting each of said common contacts with corresponding ones of said first and second contacts, a first one of said common contacts being connected at all times to one end of the starting circuit, corresponding ends of the starting circuit; and
    switch means for bypassing the deenergizing switch means comprising a first contact connected to one end of the starting circuit and a second contact connected at all times to a second one of said reversing switch common contacts such that the starting circuit can be energized while the motor is running in the opposite direction thereby rapidly decelerating the motor.

2. The control circuit as claimed in claim 1 wherein the phase shift device is a capacitor; and wherein said switch means for reversing the current direction comprises a relay operated, double-pole double-throw reversing switch.

3. The control circuit as claimed in claim 2 wherein the common contacts of said reversing switch are connectable to corresponding ends of the starting circuit, and wherein said deenergizing switch means comprises a centrifugal switch connectable in series between one of said corresponding common contacts of said reversing switch and the capacitor.

4. The control circuit as claimed in claim 3 wherein said centrifugal switch is normally closed when the motor is below a predetermined speed, and said bypassing switch means comprises a relay and a by-passing switch operated by said relay and having a common contact connected to a common contact of said reversing switch and having two active contacts, one active contact connected between the capacitor and one side of the deenergizing switch means such that the starting circuit can receive power through an alternative connection comprised of said bypassing switch and said reversing switch when said deenergizing switch is open and having the other active contact connected to the other side of said deenergizing switch means so as to prevent reenergizing the starting circuit after the motor has come up to speed.

5. The control circuit as claimed in claim 1 wherein said bypassing switch means comprises a relay and a bypassing switch operated by said relay and having a first set of contacts that include a normally open contact, a normally closed contact and a common contact, said common contact being connected to one side of the starting circuit through said reversing switch means, said normally closed contact of said first set of contacts being electrically connected between said deenergizing switch means and said starting circuit to provide an alternate means of supply power to the other side of said starting circuit, a second set of contacts that include a second, normally open contact, a second normally closed contact and a second common contact, said second common contact being connected to said first common contact and said second normally open contact being a holding contact for said bypassing relay and being connected to said starting circuit through said bypassing switch means; said bypassing relay being connected in parallel with at least a part of said starting circuit.

6. The control circuits claimed in claim 4 wherein said bypassing switch means relay is connected on one side to said other active contact of said bypassing switch and is connected to the other side to the other common contact of said reversing switch such that said other active contact of said bypassing switch also is a maintaining contact for said relay.

7. In a control circuit for a single phase AC motor capable of operating in either direction and having a running winding and a starting circuit comprising a start winding and a phase shift device connected in series, and wherein the control circuit includes a high voltage controlling circuit and a low voltage controlling circuit, the high voltage controlling circuit including a remotely operable power control switch means and a deenergizing switch means for deenergizing the starting circuit when the motor is running and the low voltage controlling circuit including an open direction relay and switch means and a close direction relay and switch means, the improvement comprising:

a reversing switch means in the high voltage controlling circuit for reversing the current direction through the start windings, said reversing switch means comprising a remotely operable double-pole, double-throw reversing switch having a set of first contacts, a set of second contacts, a set of common contacts, and two movable contact members for selectively, electrically connecting each of said common contacts with corresponding ones of said first and second contacts, a first one of said common contacts being connected at all times to one end of the starting circuit;

switch means in the high voltage controlling circuit for bypassing the deenergizing switch means comprising a first contact connected to one end of the starting circuit and a second contact connected at all times to a second one of said reversing switch common contacts such that the starting circuit can be energized while the motor is running in the opposite direction thereby rapidly decelerating the motor and;

wherein said open direction switch means includes a remotely operable energizing circuit for providing power to the open direction relay;

said close direction switch means includes a remotely operable deenergizing circuit for deenergizing the close direction relay; and the low voltage controlling circuit further includes a relay for simultaneously, remotely operating said open direction energizing circuit and said close direction deenergizing circuit.

* * * * *